United States Patent
McFarland (10) Patent No.: US 7,523,561 B2
(45) Date of Patent: Apr. 28, 2009

(54) MEASURING METHODS FOR USE ON MACHINE TOOLS

(75) Inventor: Geoffrey McFarland, Dursley (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 12/078,445

(22) Filed: Mar. 31, 2008

(65) Prior Publication Data

US 2008/0184579 A1  Aug. 7, 2008

Related U.S. Application Data

(63) Continuation of application No. 10/570,657, filed as application No. PCT/GB2004/004066 on Sep. 24, 2004, now abandoned.

(30) Foreign Application Priority Data

Sep. 24, 2003 (GB) .................................. 0322362.5

(51) Int. Cl.
*G01B 5/008* (2006.01)
(52) U.S. Cl. ........................................................ 33/554
(58) Field of Classification Search ................ None
See application file for complete search history.

(56) References Cited

U.S. PATENT DOCUMENTS

| | | |
|---|---|---|
| 4,084,323 A | 4/1978 | McMurtry |
| 4,153,998 A | 5/1979 | McMurtry |
| 4,819,195 A | 4/1989 | Bell et al. |
| 4,991,304 A | 2/1991 | McMurtry |
| 5,276,974 A | 1/1994 | Chanoni et al. |
| 5,373,222 A | 12/1994 | Hemmerle et al. |
| 5,426,861 A | 6/1995 | Shelton |
| 5,428,548 A | 6/1995 | Pilborough et al. |
| 5,471,406 A | 11/1995 | Breyer et al. |
| 5,898,590 A | 4/1999 | Wampler et al. |
| 6,400,998 B1 | 6/2002 | Yamazaki et al. |
| 6,470,587 B1 | 10/2002 | Cunningham et al. |
| 6,668,466 B1 | 12/2003 | Bieg et al. |
| 2002/0128790 A1 | 9/2002 | Woodmansee |

FOREIGN PATENT DOCUMENTS

WO  WO 03/074968 A1  9/2003

OTHER PUBLICATIONS

Renishaw plc, "Scanning Systems for Reverse Engineering," 1999.
Renishaw plc, "Installation Guide—Renscan 200—Scanning System for Machine Tools," 1997.
Renishaw plc, "Installation Guide—Retroscan—Scanning System for Machine Tools," 1996.

*Primary Examiner*—Christopher W Fulton
(74) *Attorney, Agent, or Firm*—Oliff & Berridge, PLC (57) ABSTRACT

On a machine tool, a program receives data from a scanning or analogue probe, measuring a feature of a workpiece. This data is combined with assumed machine position data during the scanning movement. This avoids having to break into the servo feedback loop to get actual measured machine position data. The assumed machine position data can be derived from a part program which controls the scanning movement. Several ways are described for compensating for errors between the assumed machine position values and the actual values.

33 Claims, 6 Drawing Sheets

MEASURING METHODS FOR USE ON MACHINE TOOLS

This is a Continuation of application Ser. No. 10/570,657 filed Mar. 6, 2006 now abandoned, which in turn is a National Stage application, which claims the benefit of PCT/GB2004/004066 filed Sep. 24, 2004 and GB 0322362.5 filed Sep. 24, 2003. The disclosure of the prior applications is hereby incorporated by reference herein in its entirety.

BACKGROUND

This invention relates to performing measurements, and particularly scanning measurements, upon workpieces using a machine tool.

SUMMARY

This invention relates to performing measurements, and particularly scanning measurements, upon workpieces using a machine tool.

It is known to mount a measuring probe in a machine tool spindle, for movement with respect to a workpiece, in order to measure the workpiece. In practice, the probe has typically been a touch trigger probe, e.g. as described in U.S. Pat. No. 4,153,998 (McMurtry), which produces a trigger signal when a stylus of the probe contacts the workpiece surface. This trigger signal is taken to a so-called "skip" input of the machine tool's numeric controller. In response, the controller takes an instantaneous reading of the machine's position (i.e. the position of the spindle and the probe relative to the machine). This is taken from measurement devices of the machine such as encoders or resolvers which provide position feedback information in a servo control loop for the machine's movement.

In the field of coordinate measuring machines (CMMs), it is known to measure workpieces using either a touch trigger probe as described above, or an analogue or scanning probe. One known type of analogue or scanning probe has a stylus for contacting the workpiece surface, and transducers within the probe which measure the deflection of the stylus relative to the probe body. An example is shown in U.S. Pat. No. 4,084,323 (McMurtry). This enables much more detailed measurements of the form of the workpiece surface than can conveniently be performed with a trigger probe. The probe is moved relative to the workpiece surface, so that the stylus scans the surface. Continuous readings are taken of the outputs of the probe transducers, and of the outputs of the encoders or other measurement devices of the machine. By combining the instantaneous probe output and the instantaneous machine output additively, digitised coordinate data is obtained for the position of the workpiece surface at a very large number of points throughout the scanning motion.

It has hitherto been difficult or impossible to use an analogue or scanning probe effectively on a machine tool, in the way just described for CMMs. One reason lies in the limitations of commercially-available machine tool controllers. It will be noted that the scanning method described above on a CMM requires that the position data from the machine's encoders or other measuring devices should be continuously available, at a high data rate, so that it can be added to the probe outputs for each data point in the scan. Conventional machine tool controllers are incapable of this. Their "skip" inputs cannot operate at the required high data rate. Thus, to perform scanning at a reasonable speed, it has been necessary to modify the controller, e.g. to enable direct sampling of data in the servo feedback loop, from the outputs of the machine's encoders or other measuring devices. The present applicants Renishaw have sold a system which does this, under the trade mark RENSCAN. However, such modifications to the controller vary from one controller to another and may not be easy, or may not even be possible.

One aspect of the present invention provides a method of measuring workpieces on a machine tool, comprising the steps of:

causing relative movement between an analogue or scanning probe and the workpiece, along a pre-defined path comprising nominal positions of the probe relative to the workpiece;

during the movement, taking measurements of the position of the workpiece surface relative to the probe, using an output of the probe; and combining said position measurements from the output of the probe with data based upon said pre-defined path.

The overall measured data is therefore a combination of data from the pre-defined path and the measurements from the probe output. By using data from the pre-defined path, it is not necessary to obtain instantaneous data from the machine's servo feedback loop relating to the actual position of the probe.

In preferred embodiments, the data based upon the pre-defined path comprises at least one target or nominal probe output reading. Assuming that the nominal position of the probe in the pre-defined path correctly reflects its actual position, then the error in the workpiece is the difference between the target or nominal probe output reading and the actual probe output reading.

The method may include a step of compensating for a difference between the nominal position in the pre-defined path and the actual position of the probe relative to the workpiece.

BRIEF DESCRIPTION OF THE DRAWINGS

Embodiments of the invention will now be described by way of example, with reference to the accompanying drawings, wherein.

DETAILED DESCRIPTION OF EMBODIMENTS

Figure 1:
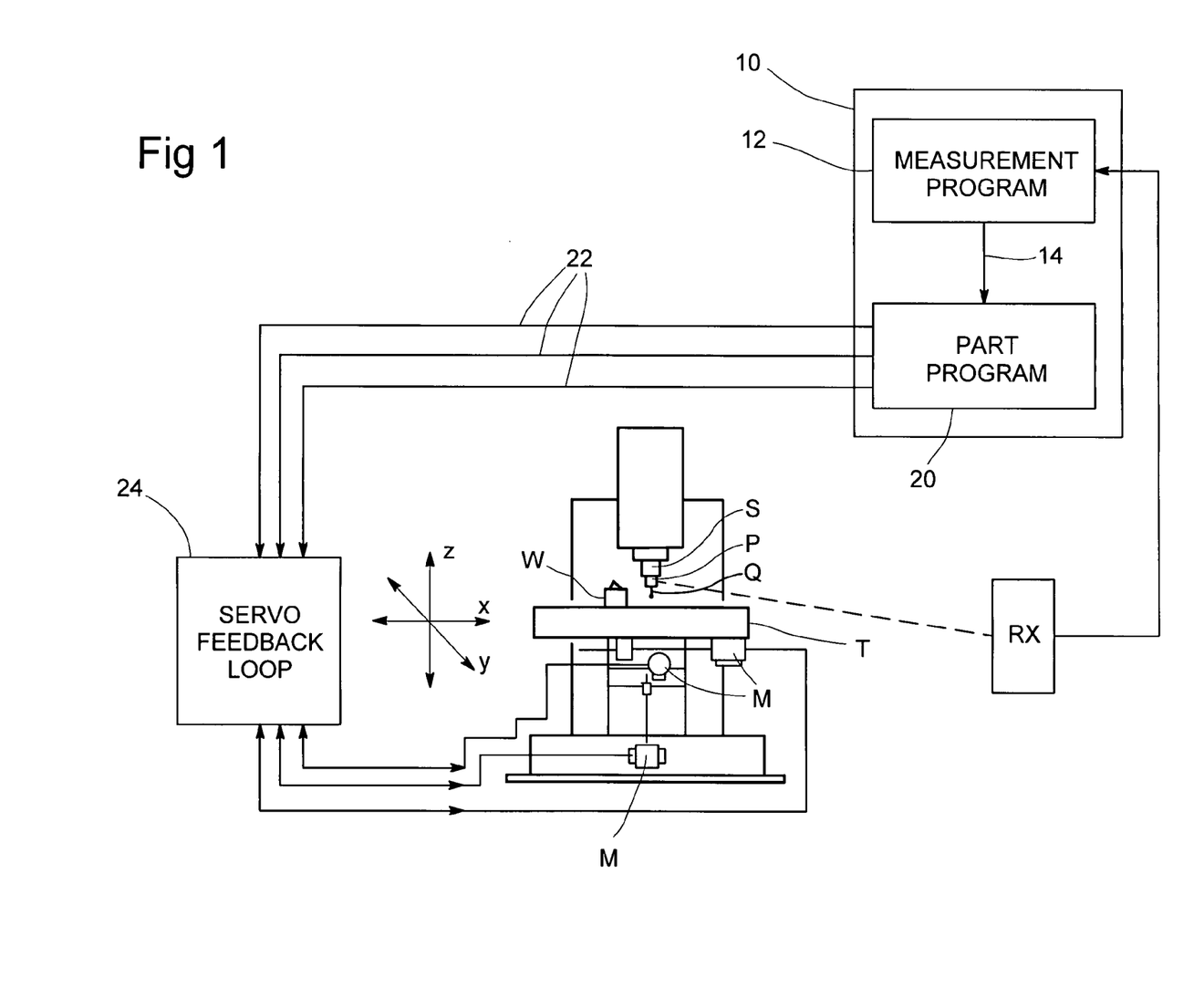
FIG. 1 shows a machine tool diagrammatically.

FIG. 1 shows a typical machine tool, comprising a table T and a spindle S which are movable relative to each other in directions x,y,z, under the action of motors M. As shown in this example, the motors M move the table, with the spindle remaining stationary. However, the invention is equally applicable to other machine tool arrangements, such as where the relative movement is produced between a stationary table or bed of the machine and a moving spindle.

Normally, a cutting tool would be mounted in the spindle S, but FIG. 1 shows an analogue or scanning probe P mounted in the spindle instead, in order to perform scanning measurements on a workpiece W mounted on the table T. The probe P has a deflectable stylus Q for contacting the surface of the workpiece W, and transducers (not shown) in the probe P measure the deflection of the stylus Q in the directions x,y,z, e.g. as described in U.S. Pat. No. 4,084,323 (incorporated herein by reference).

The outputs of the probe transducers may be analogue or digital. Other forms of analogue or scanning probe may be used, including those in which the position of the workpiece surface relative to the probe is measured in a non-contacting manner, e.g. using optical, capacitative or inductive sensors.

During scanning measurements, the probe P continually transmits the data from its transducers to a receiver RX. The signal transmission is preferably wireless, e.g. optical or radio, but a hard-wired transmission may be used instead.

The probe P is caused to move along a path relative to the workpiece W so as to scan its surface. This is done under the control of a part program 20 for the workpiece W, running in a controller 10. The part program causes demand signals to be sent on lines 22 to a servo feedback loop 24. The servo feedback loop 24 drives the motors M to achieve motion of the machine along the demanded path.

If the controller 10 in which the part program 20 runs is the conventional standard numeric control of the machine tool, then the servo feedback loop 24 also forms part of the controller 10. Alternatively, the controller 10 may be a separate computer, feeding the demanded path data to the servo feedback loop in the standard numeric control. It may form part of an interface between the probe and the machine's standard control.

As is conventional, the servo loop 24 receives position feedback information from measuring systems of the machine, such as encoders or resolvers (not shown). The servo loop 24 drives the motors so as to tend to keep the actual path as indicated by the machine's measuring systems in accordance with the demanded machine path from the part program 20.

Figure 2:
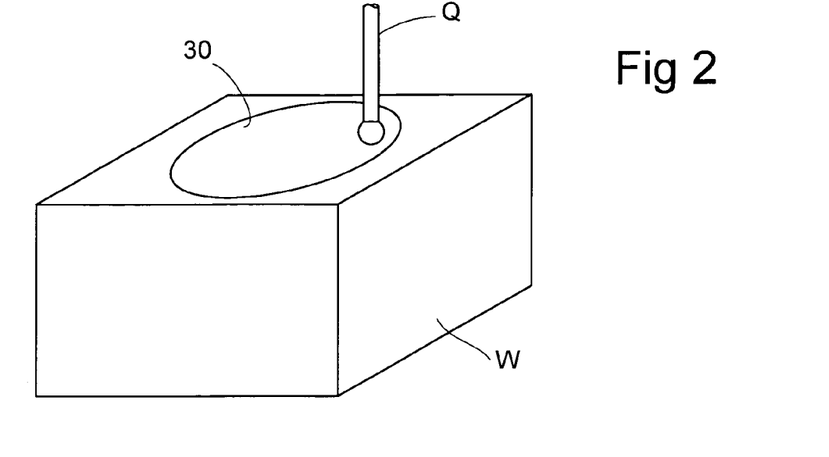
FIGS. 2 and 3 are isometric and plan views respectively, showing a stylus tip scanning a workpiece.
Figure 3:
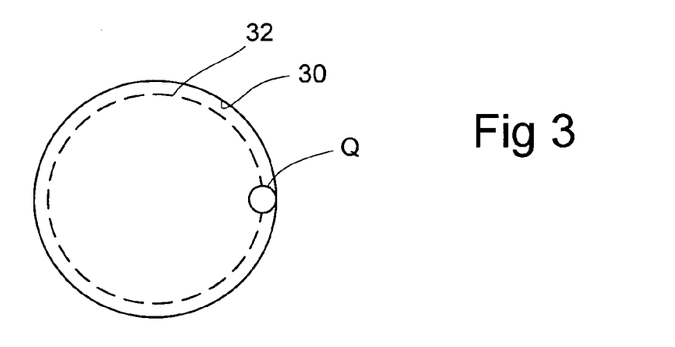

FIGS. 2 and 3 show in more detail the stylus Q scanning a surface of the workpiece W. As a simple example, it is shown scanning the internal surface of a circular hole 30, in order to determine deviations from a true circular form. In this case, the part program 20 commands the relative motion of the probe and the workpiece along a pre-defined circular machine path 32. This machine path has a predetermined radius which is slightly smaller than the radius of the circular hole 30, chosen to allow for the radius of the stylus tip. It is also chosen to ensure that, for any possible deviations of the surface of the hole 30 from a true circular form, the stylus tip will remain in contact with the surface and within the measuring range of the probe (i.e. the permissible deflection of the stylus as measured by the transducers within the probe).

Figure 4:
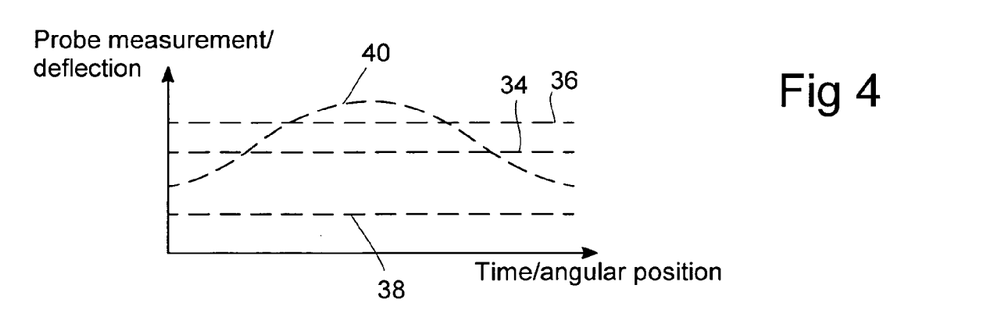
FIG. 4 is a graph of probe measurements during the scanning.

FIG. 4 shows the possible deflections of the stylus Q relative to the probe P, as measured by the probe's transducers, in a graph against either time or angular position around the hole 30. In particular, the graph represents deflections in a radial direction, which could be calculated from the probe's x and y outputs in the present example. A line 34 indicates the nominal probe output expected if the hole has the correct size and circular form. A line 36 indicates the probe output if the hole is too small. A line 38 indicates the hole is oversize. A sinusoidal curve 40 shows that the hole is off-centre from its nominal position. Of course, other deviations from the nominal line 34 are possible, such as irregular deviations if the surface of the hole 30 deviates from the intended circular form.

Referring back to FIG. 1, the controller 10 runs a measurement program 12 in addition to the part program 20. This measurement program 12 is responsible for taking a large number of measurement readings, at a suitably high data rate, at positions along the time/angular position axis in FIG. 4. To do this, it combines two sources of data. One is the output from the probe P, received from the receiver RX. The other is the instantaneous assumed or demanded machine position (i.e. the position of the spindle S and probe P relative to the table T). The latter is derived from the pre-defined path set by the part program 20, as indicated by an arrow 14. This is in contrast to prior art in which it is derived from the encoders or resolvers or other position measurement devices in the machine's servo feedback loop.

One way to combine these data sources is as follows. For each of a high number of data points along the machine path, the corresponding probe output and assumed machine position are combined additively, as shown graphically in FIG. 5. Here, a line 42 indicates the radius of the pre-defined machine path 32, as derived by the measurement program 12 from the part program 20. To this is added the output of the probe, as shown in FIG. 4, for each data point (i.e. at each time instant or angular position). The result is shown by the line 44 in FIG. 5. The radius of the pre-defined machine path may simply be as used by a conventional G-code in the part program 20 for commanding the movement in the circular path.

A preferred alternative way to combine the data sources is as follows. The program 12 includes a target or nominal value for the probe deflection. For example, the pre-defined machine path may be chosen such as to cause a nominal or target probe deflection (in the radial direction) $D_{target}$. This is the value of deflection that would be seen if the workpiece conformed to its nominal size and position. The value $D_{target}$ may be pre-programmed into the program 12, based on the pre-defined path, or it may be calculated by the program 12 from values received from the part program 20 about the pre-defined path. As the measurement proceeds, the program 12 also receives values for the actual probe deflection $D_{actual}$, via the receiver RX. It compares these two sources of data by combining them subtractively to give the actual variation error at any position:

$$\text{Error} = D_{actual} - D_{target}$$

For example, if the target deflection was 100 μm and the actual deflection was 101 μm, then the error in the size of the workpiece would be 1 μm.

So far, the errors have been considered at each individual position around the hole 30. This may indeed be what is desired, e.g. to determine errors of form. However, it is also possible for the program 12 to perform data fitting algorithms, to consider the errors overall. For example, where a sinusoidal error is found, as indicated at 40 in FIG. 4, such an algorithm may determine the true centre point of the hole, and its deviation from the nominal centre point. And/or such an algorithm may determine the average radius of the hole and the deviation from this value.

Of course, the methods described are not restricted to circular forms as in FIGS. 2-5, and can be used to determine the form of many other machined features.

Figure 12:
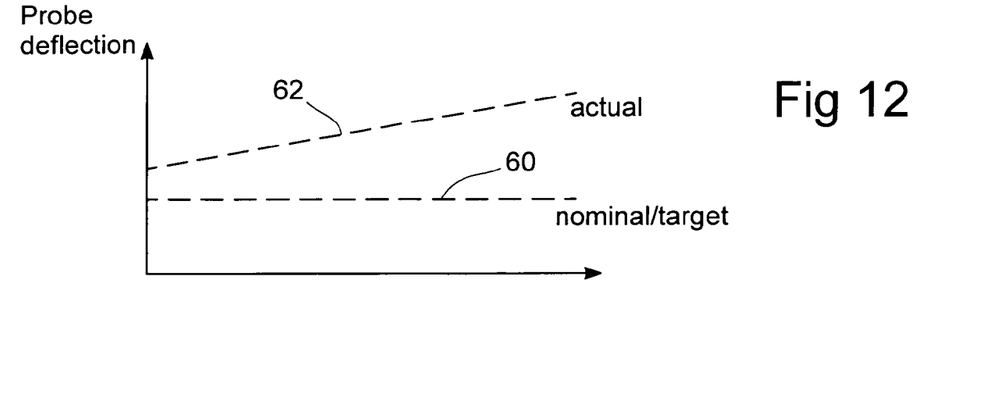
FIG. 12 is a graph corresponding to FIG. 4 but showing an embodiment of measurement along a straight line.

For example, FIG. 12 illustrates the case of inspecting a straight line along a nominally flat workpiece surface. Here, a line 60 represents a pre-defined nominal or target value for the probe deflection as it is driven along the line by the part program. The actual values as received by the program 12 from the probe are subjected to a best-fit algorithm to determine the best straight line fit, and this is represented by the line 62. It is then simple for the program 12 to calculate the slope and offset of the line 62, relative to the nominal line 60, and accordingly to indicate the errors of the position and orientation of the workpiece surface which has been measured.

It is also possible to apply an intelligent fitting algorithm to the data, to determine what type of feature is being measured, and then select and perform a suitable method to calculate its errors.

The methods so far described give reasonably accurate results. For example, if the hole 30 was previously machined by a cutting tool placed in the spindle S, following a cutting part program from the controller 10, the tool may have been subjected to deflections under the loads applied during cutting. This may result in the hole having incorrect size and form. Because the probe P is not subject to such cutting loads, it is able to measure such errors. Since it performs a scanning operation it can measure deviations from the correct form over the whole circumference, as well as simple dimensions such as the hole's diameter or radius and centre point. This is an advantage over conventional touch trigger probes.

As well as giving detailed measurements, the methods described can also be used for verification of a machined workpiece, i.e. the program can output a pass/fail indication to show whether the workpiece is within desired tolerances.

Such measurements can also be useful in process control, e.g. to update machining offsets (tool offsets) prior to a final cut. This enables the final cut to give precisely the required dimensions to the workpiece feature concerned. Likewise, the measurements can be used to update workpiece offsets for future machining, e.g. where the position of the feature measured is found to differ from its nominal position.

Figure 5:
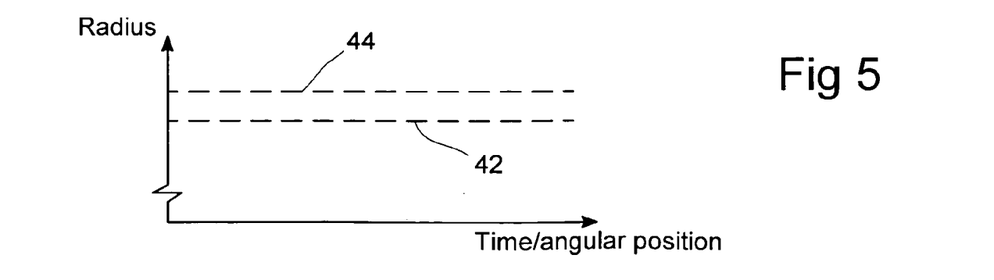
FIG. 5 is a graph showing the combination of probe measurements with assumed machine position data.

The method of FIGS. 3-5 can also be used for job set-up, i.e. setting up a workpiece which has previously had features machined on a different machine. The method is then performed on a new machine in order to locate these existing features. The new machine may be for example a jig borer which is to bore holes in the workpiece, accurately placed relative to the existing features. Again, because the form of the features can be scanned, and a best-fit algorithm can be used to fit them to their nominal form, this enables more accurate results than with a conventional touch trigger probe.

However, the method as described so far is subject to some inaccuracy, for example because of servo mismatch in the servo loop 24. Servo mismatch stems from differences between the actual and the demanded position. For example, when travelling around a circular path in the x-y plane, there may be phase errors in the nominally 90° phase difference between the sinusoidal paths on which the x-axis and y-axis servos drive their respective motors M. The actual position of the x-axis servo may catch up to its demanded position faster or slower than the y-axis servo, due to differing axis response characteristics. Similar mismatch can occur if, say, the commanded path is a straight line at an angle to the machine's axes, but it is not much of a problem if the path lies parallel to one of the axes. There can also be other causes of servo errors, e.g. backlash, or scale errors in the machine's encoders or resolvers or other measuring systems.

Thus, it is likely that, at any given instant, the actual position of the machine (i.e. the actual position of the spindle S and probe P relative to the table T) will not be exactly in accordance with the position demanded on the lines 22 by the part program 20. There will therefore be a difference between the assumed position values supplied on the line 14 to the measurement program 12 and the actual positions.

Figures 6, 7:
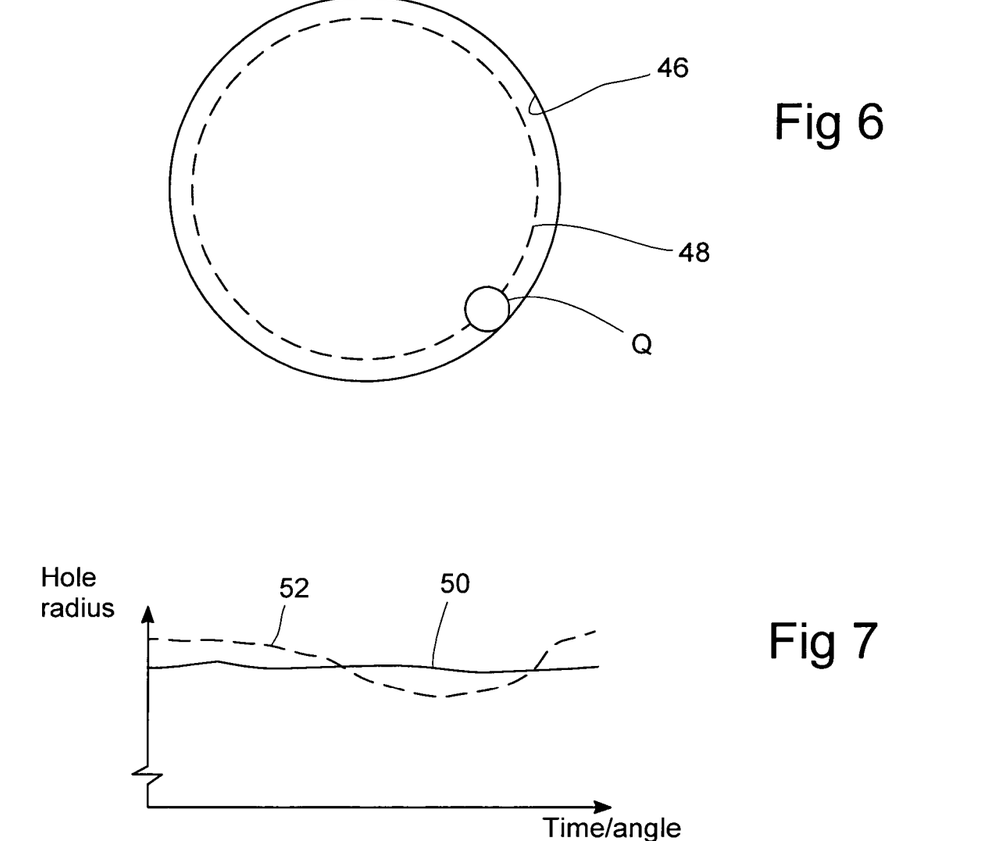
FIG. 6 shows a calibration artefact being scanned.
FIGS. 7 and 8 are graphs explaining a calibration method.

For greater accuracy, therefore, an optional calibration process will be described with reference to FIGS. 6, 7 and 8. The calibration makes use of an artefact having known dimensions and form, which should preferably (but not essentially) be substantially similar to the workpiece or features to be measured. For example, in the case of measuring the circular hole 30 of FIGS. 2 and 3, the artefact may be the internal surface 46 of a ring gauge of accurately known radius and form (FIG. 6). This is scanned by a part program 20 which commands the machine to move along a circular path 48, corresponding to the path 32 in FIG. 3.

In FIG. 7, a line 50 indicates the accurately known form and radius of the artefact. A line 52 indicates the measured value, obtained by the measurement program 12 by any of the methods described above. The deviations between these two lines indicate the instantaneous errors between the assumed machine position value and the actual position value, as it moves along the commanded machine path.

Figure 8:
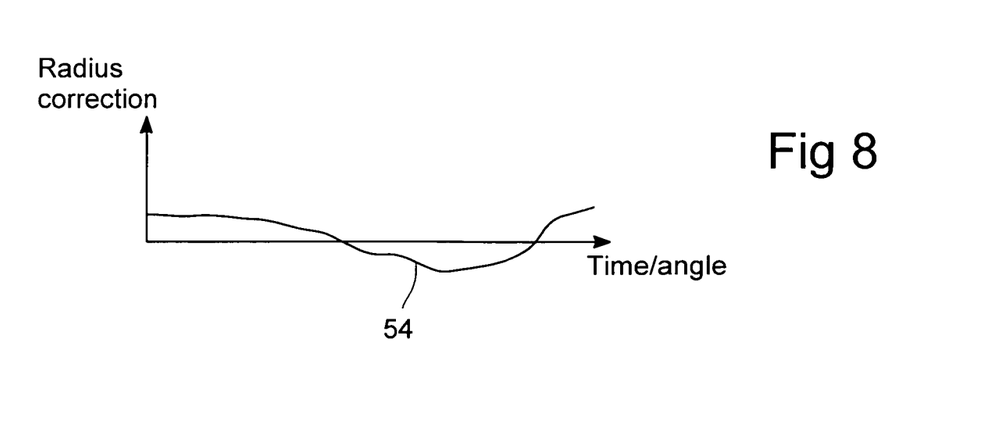

By subtracting the corresponding values of points on the lines 50 and 52, there are obtained values which lie on a curve 54, shown in FIG. 8. This indicates, for any position along the machine path (in terms of time or in terms of angle where a circular measurement is being made) the radius correction which is required, in order to correct for the difference between the assumed machine position and the actual machine position. These radius correction values are stored within the controller 10. When a measurement is made on a production workpiece W, the measurement program 12 combines these correction values with the assumed machine position values and the measurements from the probe P in order to obtain an accurate measurement.

Figure 13:
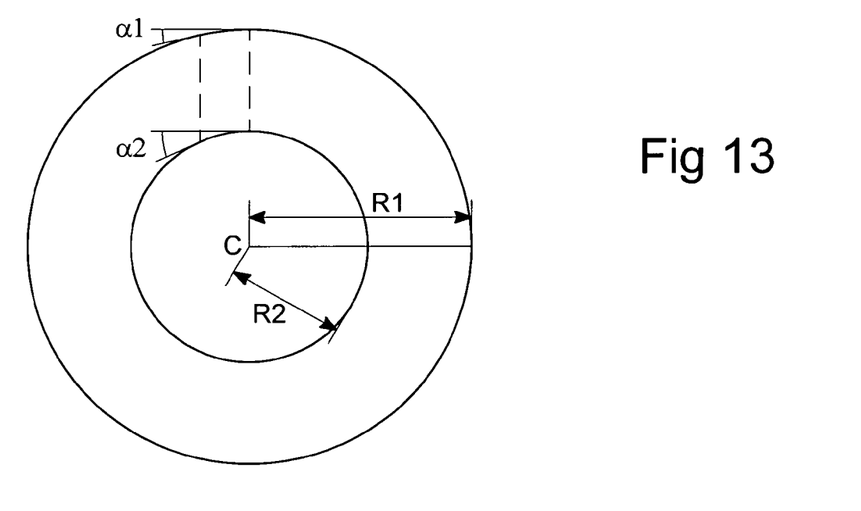
FIGS. 13 and 14 are diagrams illustrating mathematical calculations used in a further development of the calibration method of FIGS. 7 and 8.

If the artefact 46 is not the same size as the workpiece feature (e.g. it is a circle of a different radius) and/or if the scanning of the artefact and workpiece took place at different tangential or angular velocities, then this may be compensated by mathematical calculations. This is illustrated in FIG. 13.

Assuming that scanning takes place at the same speed, for a circle with radius R1, the change in curvature is smaller as the motion is taking place, relative to the circle with radius R2, where the change in curvature is bigger over time, for the same distance. In other words, the angle $\alpha 1$ is smaller than $\alpha 2$. This leads to, for example, mismatch in servos that would result in a bigger difference for circle R2 than it would for R1, i.e. the ellipse resulting from the mismatch in the servos would have its maximum radius differing from the nominal by a bigger value leading to bigger errors.

This can be compensated through measuring the difference between the nominal circle and the obtained ellipse for the R1 circle, then doing the same for the R2 circle.

Then if the measured bore has a radius that is between R1 and R2, then this can be dealt with using interpolation. For example, where R1 is bigger than R2:

$$CR1 \rightarrow err1$$

$$CR2 \rightarrow err2$$

where

CR1 is a circle of radius R1

CR2 is a circle of radius R2

Figure 14:
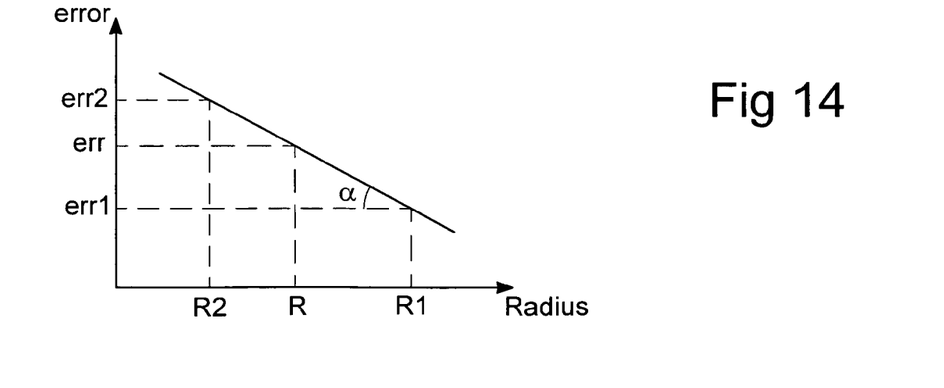

And as discussed above, it is expected that err1 is smaller than err2. Assuming linearity, which is an acceptable assumption between close sizes, then referring to FIG. 14:

$$\tan(\alpha) = \frac{err - err1}{R1 - R} = \frac{err2 - err1}{R1 - R2}$$

and therefore $$err = \frac{(err2 - err1)*(R1 - R)}{(R1 - R2)} + err1$$

This is the error (difference from real to nominal) calculated through interpolation.

The above discussion is also valid if the measurement is done at different speeds for the same size artefact, i.e. the artefact is measured at two different but close speeds (for linearity) and the errors recorded (deviations from nominal). Then an interpolation algorithm would be used to calculate the resulting error from a speed that is in between the two. This algorithm is similar to the one above.

Another way to improve the accuracy of the measurements will now be described with reference to FIGS. 9, 10 and 11. This is modified from the above methods, in that it uses reference points on the surface of the workpiece W to be measured. In practice, these will be points in the hole 30 on the path which is to be scanned.

Figure 9:
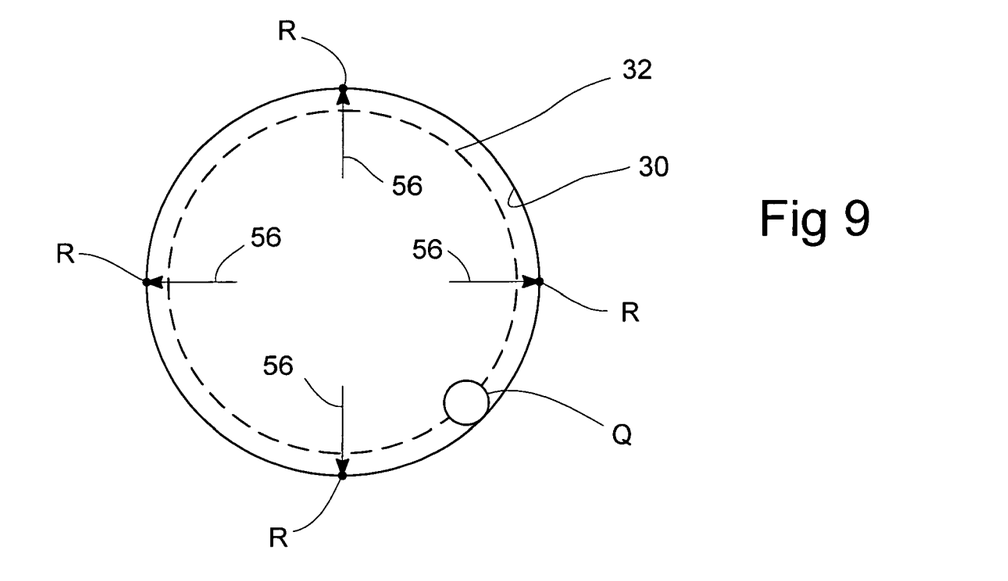
FIG. 9 is a view corresponding to FIG. 3, but showing the measurement of reference points.

In FIG. 9, four reference points R are chosen. At each of these reference points, the machine is driven such that the stylus tip Q approaches the reference point R in a radial direction, as indicated by arrows 56. The probe P may be used in a touch trigger mode, in which a threshold value is defined in its measuring range, at which a trigger signal is issued. This trigger signal may then be taken to the conventional skip input of the machine's controller, in the same way as with a conventional touch trigger probe. The controller produces coordinate values for each reference point R as a result of this operation. Thus, the reference points R are true machine position values, not assumed machine position values.

As a preferred alternative to using the skip input to obtain trigger values, the machine can be driven to the reference points, stop, then the probe output can be determined and added to the machine's position to give the value R. The accuracy of this value can be increased by static averaging, that is by dwelling in the stopped position for a period of time, taking multiple readings of the probe's outputs, and averaging them. This gives an accurate measurement because the machine is stopped and therefore there are no servo errors.

Figure 10:
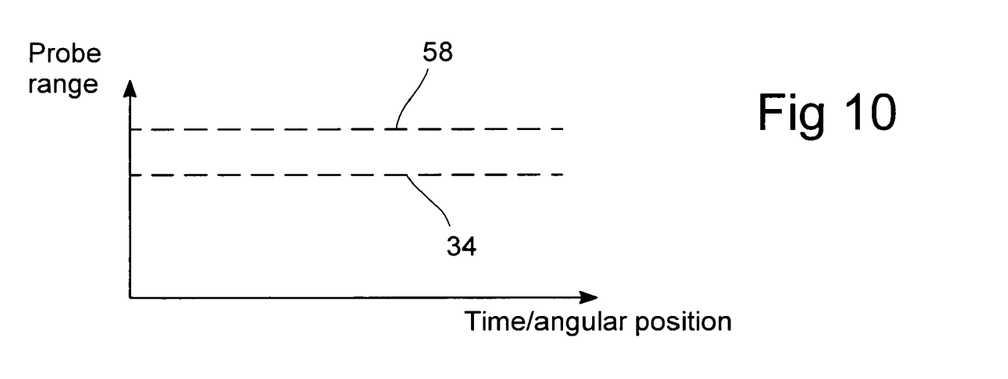
FIGS. 10 and 11 are graphs corresponding to FIGS. 4 and 5, but using the reference point measurements of FIG. 9.
Figure 11:
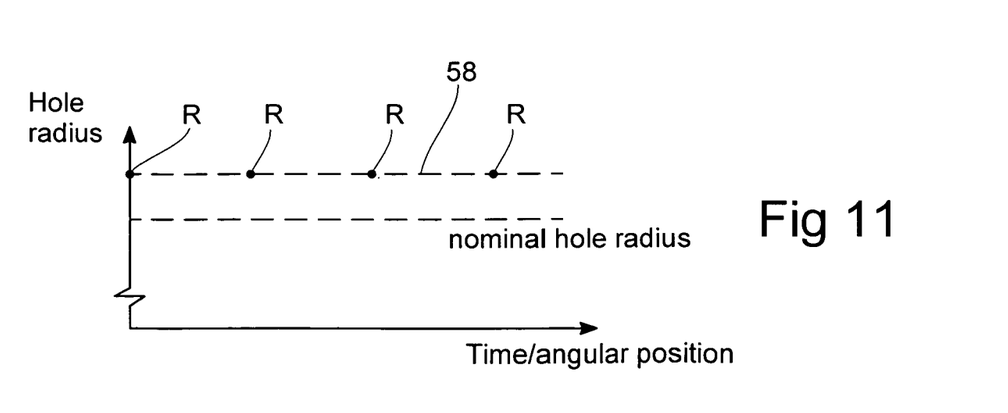

FIGS. 10 and 11 correspond to FIGS. 4 and 5, and show how these reference points are used to calculate the resulting measurements. In FIG. 10, a line 58 indicates the probe measurement values from the scanning, using assumed position values as previously. These values deviate from the nominal values 34 in the same way as shown in FIG. 4. FIG. 11 shows the four values of the reference points R. To produce the final measured value, the measurement program 12 uses a best-fit algorithm to superimpose the values from the line 58 in FIG. 10 onto these reference points R. Thus, the values determined by using assumed positions are adjusted to fit these known values R.

Since it is known that the values R are true values, the intermediate values on the line 58 in FIG. 11 are more accurate than would otherwise be the case. This enhanced method thus uses a combination of scanning and reference points to improve the overall accuracy of the scanning measurements.

Figure 15:
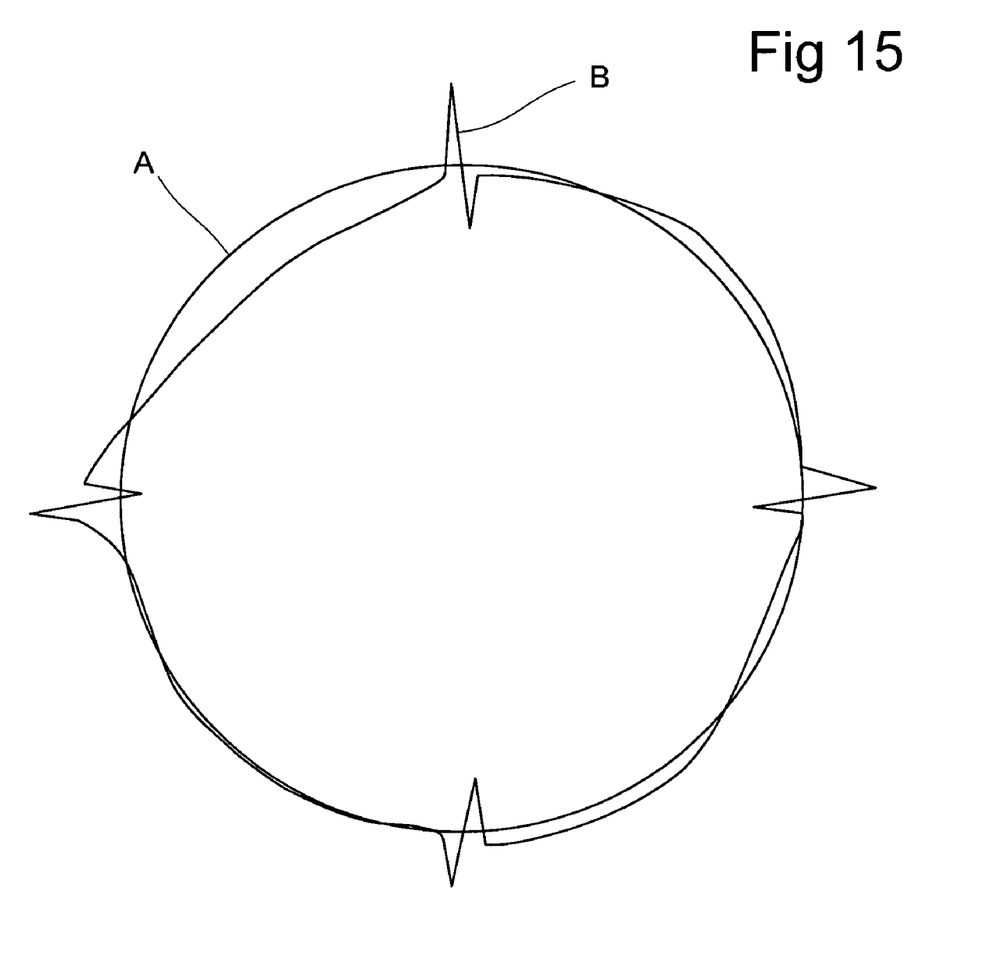
FIG. 15 is a diagram illustrating a further method of compensation.

FIG. 15 illustrates yet another way to provide compensation to improve the accuracy. Curve B shows the result of scanning a circular feature at a normal, preferred speed. It includes distortions caused by backlash and other servo errors. Curve A shows the result of scanning the same circular feature at a slower speed; it will be seen that the distortions are avoided.

Thus, a further embodiment of the invention makes use of this fact. The circle is scanned both at the slow and the fast speeds, and the resulting probe output data is recorded. An error map for the feature is then generated, containing error correction values for each position around the feature. This is done by a subtraction (B–A). For each position, the probe output during the slow scan A is subtracted from the corresponding output during the normal speed scan B.

This error map may be generated by scanning a first-off workpiece in a production run of nominally identical workpieces, or an artefact of the desired size and form, or even of a different size if compensation according to FIGS. 13 and 14 is applied. The error map is then stored for future use by the program 12 when measuring similar features of future workpieces.

Such future measurements are performed in accordance with the methods described above, e.g. in relation to FIGS. 3 to 5. As discussed previously, this may determine the feature size (by comparing the actual probe output with the assumed value from the part program 20). Alternatively it may determine the error in the feature, by comparing the actual probe output with a target probe output ($D_{actual} - D_{target}$).

In either case, the measurements are then compensated by applying corrections in accordance with the error map, subtracting the stored error value for each position from the corresponding measured value.

As with other embodiments, the methods according to FIGS. 9-11 and 15 are applicable not only to circular features, but may be used to determine the form of many other machined features.

What is claimed is:

1. A method of measuring workpieces on a machine tool, comprising the steps of:
    causing relative movement between an analogue or scanning probe and a workpiece, along a pre-defined path comprising nominal positions of the probe relative to the workpiece, under control of a part program;
    during the movement, taking measurements of a position of a surface of the workpiece relative to the probe, using an output of the probe; and
    combining said measurements from the output of the probe with assumed data derived from said part program.

2. A method according to claim 1, wherein a result of said combining step gives a dimension of the workpiece.

3. A method according to claim 1, wherein the assumed data derived from said part program comprises at least one target or nominal probe output reading.

4. A controller or probe interface for a machine tool, programmed to perform a method according to claim 3.

5. A method according to claim 1, wherein a result of said combining step gives an error value for a dimension of the workpiece.

6. A method according to claim 1, including a step of compensating for a difference between the assumed data derived from the part program and an actual position of the probe relative to the workpiece.

7. A method according to claim 6, wherein the compensating step uses data from an artifact of known dimensions and form.

8. A method according to claim 7, wherein the artifact has similar dimensions to a feature of the workpiece being measured.

9. A method according to claim 7, wherein the artifact has a dissimilar dimension to the feature being measured, or is measured at a dissimilar speed, and the compensation includes interpolation to correct for such dissimilar dimension or speed.

10. A method according to claim 6, wherein the compensating step uses data from reference points measured on the surface of the workpiece.

11. A method according to claim 6, wherein the compensating step uses an error map determined by comparing scans of the surface of the workpiece at slow and fast speeds.

12. A controller or probe interface for a machine tool, programmed to perform a method according to claim 1.

13. A method of measuring workpieces on a machine tool, comprising the steps of:
    causing relative movement between an analogue or scanning probe and a workpiece, along a pre-defined path comprising nominal assumed first positions of the probe;
    during the movement, taking measurements of a workpiece surface relative to the probe, using an output of the probe; and
    combining said measurements from the output of the probe with data derived from the assumed first positions of the probe.

14. A method according to claim 13, wherein a result of said combining step gives a dimension of the workpiece.

15. A method according to claim 13, wherein data derived from the pre-defined path comprises at least one target or nominal probe output reading.

16. A method according to claim 13, wherein a result of said combining step gives an error value for a dimension of the workpiece.

17. A method according to claim 13, including a step of compensating for a difference between a nominal assumed position in the pre-defined path and an actual position of the probe relative to the workpiece.

18. A method according to claim 17, wherein the compensating step uses data from an artifact of known dimensions and form.

19. A method according to claim 18, wherein the artifact has similar dimensions to the feature of the workpiece being measured.

20. A method according to claim 18, wherein the artifact has a dissimilar dimension to the feature being measured, or is measured at a dissimilar speed, and the compensation includes interpolation to correct for such dissimilar dimension or speed.

21. A method according to claim 17, wherein the compensating step uses data from reference points measured on the workpiece surface.

22. A method according to claim 17, wherein the compensating step uses an error map determined by comparing scans of the workpiece surface at slow and fast speeds.

23. A controller or probe interface for a machine tool, programmed to perform a method according to claim 13.

24. A method according to claim 13, wherein:
    the causing relative movement is under control of a part program; and
    the assumed first positions of the probe are derived from the part program.

25. A method of measuring workpieces on a machine tool, comprising the steps of:
    causing relative movement between an analogue or scanning probe and a workpiece, along a pre-defined path comprising nominal positions of the probe relative to the workpiece;
    during the movement, taking measurements of a position of a surface of the workpiece relative to the probe, using an output of the probe; and
    combining said position measurements from the output of the probe with at least one target or nominal value of the probe output reading.

26. The method according to claim 25, wherein a result of said combining step gives an error value for a dimension of the workpiece.

27. The method according to claim 25, further comprising a step of compensating for a difference between a nominal position in the pre-defined path and an actual position of the probe relative to the workpiece.

28. The method according to claim 27, wherein the compensating step uses data from an artefact of known dimensions and form.

29. The method according to claim 28, wherein the artefact has similar dimensions to a feature of the workpiece being measured.

30. The method according to claim 28, wherein the artefact has a dissimilar dimension to a feature being measured, or is measured at a dissimilar speed, and the compensating step includes interpolating to correct for such dissimilar dimension.

31. The method according to claim 27, wherein the compensating step uses data from reference points measured on the workpiece surface.

32. The method according to claim 27, wherein the compensating step uses an error map determined by comparing scans of the workpiece surface at slow and fast speeds.

33. A controller or probe interface for a machine tool, programmed to perform the method according to claim 25.

* * * * *